(12) United States Patent
Hashimoto et al.

(10) Patent No.: US 9,749,165 B2
(45) Date of Patent: Aug. 29, 2017

(54) ELECTRONIC THERMOMETER, ELECTRONIC THERMOMETER SYSTEM, AND RECEIVER

(71) Applicant: TDK Corporation, Minato-Ku, Tokyo (JP)

(72) Inventors: Kazunori Hashimoto, Saitama-ken (JP); Hiromi Sakata, Tokyo (JP); Hisashi Yoshikawa, Tokyo (JP); Kumiko Yamato, Kanagawa-ken (JP)

(73) Assignee: TDK Corporation, Tokyo (JP)

( * ) Notice: Subject to any disclaimer, the term of this patent is extended or adjusted under 35 U.S.C. 154(b) by 639 days.

(21) Appl. No.: 14/189,690

(22) Filed: Feb. 25, 2014

(65) Prior Publication Data

US 2014/0241397 A1  Aug. 28, 2014

(30) Foreign Application Priority Data

Feb. 25, 2013 (JP) .................................. 2013-035045

(51) Int. Cl.
*H01L 27/12* (2006.01)
*H04L 27/12* (2006.01)
(Continued)

(52) U.S. Cl.
CPC .............. *H04L 27/12* (2013.01); *G01K 1/024* (2013.01); *H04L 27/01* (2013.01); *H04L 2027/0087* (2013.01)

(58) Field of Classification Search
CPC . H04L 27/12; H04L 27/01; H04L 2027/0087; H04L 27/00; H04L 27/0002;
(Continued)

(56) References Cited

U.S. PATENT DOCUMENTS 3,384,822 A * 5/1968 Miyagi ..................... H04L 5/02
                                                      332/100
4,268,818 A * 5/1981 Davis ..................... G01K 1/024
                                                      174/146
(Continued)

FOREIGN PATENT DOCUMENTS

JP       2001-175271 A       6/2001
JP       2002-058078 A       2/2002
(Continued)

OTHER PUBLICATIONS

Japanese Office Action issued on Jun. 9, 2015 in corresponding Japanese Application No. 2013-035045, along with English translation thereof.

*Primary Examiner* — Lisa Caputo
*Assistant Examiner* — Philip Cotey
(74) *Attorney, Agent, or Firm* — White & Case LLP

(57) ABSTRACT

According to one embodiment, an electronic thermometer includes a temperature sensing unit, a conversion unit, an FSK modulation unit, and a transmission unit. The temperature sensing unit detects the temperature of a subject. The conversion unit converts a result detected by the temperature sensing unit to a digital signal. The FSK modulation unit converts the digital signal from the conversion unit to an FSK modulation signal. The transmission unit outputs a transmission signal including a pilot signal having a frequency assigned to the FSK (frequency shift keying) modulation signal and the FSK modulation signal subsequent to the pilot signal.

5 Claims, 5 Drawing Sheets

(51) Int. Cl.
 *G01K 1/02* (2006.01)
 *H04L 27/01* (2006.01)
 *H04L 27/00* (2006.01)

(58) Field of Classification Search
 CPC ....... H04L 27/10; H04L 27/106; H04L 27/20;
  H04L 27/2003; H04L 27/201; G01K
  1/024
 USPC .................. 374/170; 375/231, 269, 272, 303
 See application file for complete search history.

(56) References Cited

U.S. PATENT DOCUMENTS

| | | | | |
|---|---|---|---|---|
| 4,882,564 | A * | 11/1989 | Monroe | B60H 1/00978 340/449 |
| 5,222,250 | A * | 6/1993 | Cleveland | H04B 1/68 332/170 |
| 5,289,500 | A * | 2/1994 | Inou | H04B 3/548 324/76.12 |
| 5,446,452 | A * | 8/1995 | Litton | B61K 9/04 246/159 |
| 5,940,436 | A * | 8/1999 | Huloux | H04B 3/542 370/431 |
| 6,046,674 | A * | 4/2000 | Irwin | G01K 1/024 340/506 |
| 6,300,871 | B1 * | 10/2001 | Irwin | G01K 1/024 340/506 |
| 6,412,977 | B1 * | 7/2002 | Black | G01K 1/024 323/315 |
| 7,015,826 | B1 * | 3/2006 | Chan | A01K 11/006 340/10.41 |
| 7,825,781 | B2 * | 11/2010 | Matsumura | B60C 23/0408 331/1 R |
| 2002/0105436 | A1 * | 8/2002 | Bell | G01K 7/245 340/870.17 |
| 2006/0047480 | A1 * | 3/2006 | Lenz | G01K 1/024 702/183 |
| 2006/0122473 | A1 * | 6/2006 | Kill | G01J 5/04 600/300 |
| 2007/0165741 | A1 * | 7/2007 | Zeng | H04L 27/10 375/272 |
| 2008/0193139 | A1 * | 8/2008 | Bettesh | A61B 1/041 398/128 |
| 2009/0163772 | A1 * | 6/2009 | Koide | A61B 1/00016 600/118 |

FOREIGN PATENT DOCUMENTS

| | | |
|---|---|---|
| JP | 2002-288775 A | 10/2002 |
| JP | 2011-179900 A | 9/2011 |
| JP | 2012-193967 A | 10/2012 |

* cited by examiner

ELECTRONIC THERMOMETER, ELECTRONIC THERMOMETER SYSTEM, AND RECEIVER

CROSS REFERENCE TO RELATED APPLICATION

This application is based upon and claims the benefit of priority from the prior Japanese Patent Application No. 2013-035045, filed on Feb. 25, 2013, the entire contents of which are incorporated herein by reference.

FIELD

Embodiments described herein relate to an electronic thermometer, an electronic thermometer system, and a receiver.

BACKGROUND

A technique is disclosed that acoustically transmits a result measured by an electronic thermometer and displays the measured result using a receiver such as a storage case.

DETAILED DESCRIPTION

Figure 1:
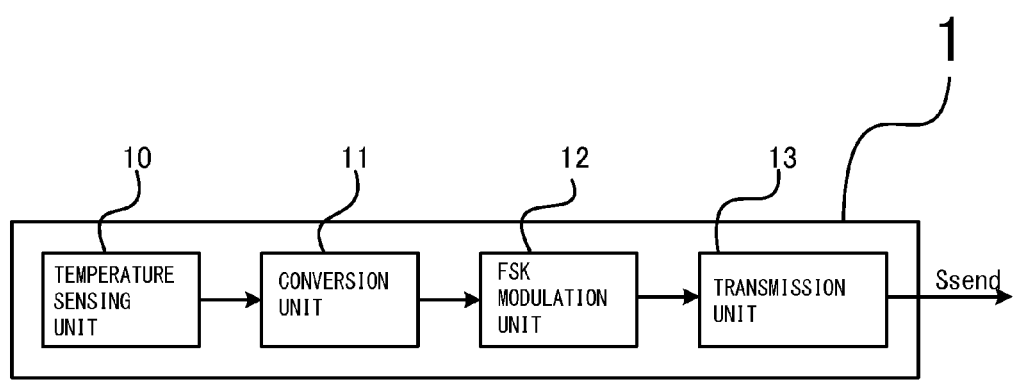
FIG. 1 is a diagram showing the configuration of an electronic thermometer according to a first embodiment.

According to one embodiment, an electronic thermometer includes a temperature sensing unit, a conversion unit, an FSK modulation unit, and a transmission unit. The temperature sensing unit detects the temperature of a subject. The conversion unit converts a result detected by the temperature sensing unit to a digital signal. The FSK modulation unit converts the digital signal from the conversion unit to an FSK (frequency shift keying) modulation signal. The transmission unit outputs a transmission signal including a pilot signal having a frequency assigned to the FSK modulation signal and the FSK modulation signal subsequent to the pilot signal.

Further embodiments are described below with reference to the drawings. Identical reference numerals in the drawings denote the same or similar elements. An electronic thermometer system is described in detail that includes the electronic thermometer according to the embodiment and a receiver to receive results measured by the electronic thermometer.

An electronic thermometer according to a first embodiment is described with reference to the drawings. FIG. 1 is a diagram showing the configuration of an electronic thermometer. As shown in FIG. 1, an electronic thermometer 1 includes a temperature sensing unit 10, a conversion unit 11, an FSK modulation unit 12, and a transmission unit 13.

The temperature sensing unit 10 has a thermistor, for example. The temperature sensing unit 10 detects the temperature of a subject. A result detected by the temperature sensing unit 10 is sent to the conversion unit 11. The conversion unit 11 converts the result detected by the temperature sensing unit 10 to binary digits. The output signal of the conversion unit 11 is sent to the FSK modulation unit 12. The FSK modulation unit 12 performs FSK (frequency shift keying) modulation to assign the binary digit from the conversion unit 11 to a predetermined frequency.

The embodiment assigns the binary digits from the conversion unit 11 to three frequencies $F_1$ to $F_3$. For example, two frequencies $F_1$ (15 KHz) and $F_3$ (19 KHz) are assigned to a binary digit "1", and a frequency $F_2$ (17 KHz) is assigned to a binary digit "0". Thus, an FSK modulation signal consists of three frequencies $F_1$ to $F_3$. Frequencies in the range of about 10 KHz to 22 KHz, for example, are preferably used for the assignment. Frequencies to be used are preferably selected based on 10 KHz, which is generally thought to be the limit of an audible frequency for humans, and the upper limit of the frequency used for audio equipment. The use of frequencies beyond the audible frequency for humans can avoid discomfort due to the occurrence of sound associated with data transmission from the electronic thermometer 1. When a transmission signal Ssend is sent from the electronic thermometer 1 to an existing electronic device such as a smartphone, overlapping of sound waves with the existing electronic device for the purpose of picking up signals of the audible frequency band for humans can be reduced. Here, "picking up" means to collect sounds in a broad sense, which includes sound collection whereby sounds are consciously collected from a specific direction using a parabolic antenna, etc. It is preferable that all of frequencies for use are used within the limits described above. However, it is possible to achieve the effect of the embodiment in the case where at least one of frequencies is within the limits described above.

The FSK modulation signal from the FSK modulation unit 12 is sent to the transmission unit 13. The transmission unit 13 adds, to the FSK modulation signal, a pilot signal and a checksum signal consisting of the frequencies $F_1$ to $F_3$ assigned to the FSK modulation signal, and outputs these signals to the outside of the electronic thermometer 1 as the transmission signal Ssend. The configuration of the signal will be described later.

Most of electronic thermometers are usually manufactured at a low cost to increase cost performance. Accordingly, a signal transmitted from an electronic thermometer is likely to be less stable.

On the other hand, the electronic thermometer of the embodiment includes the temperature sensing unit 10, the conversion unit 11, the FSK modulation unit 12, and the transmission unit 13. The transmission unit 13 of the electronic thermometer 1 externally sends the FSK modulation signal to which the pilot signal and the checksum signal consisting of the frequencies $F_1$ to $F_3$ are added.

Accordingly, the embodiment can improve the stability of the signals transmitted from the electronic thermometer 1.

An electronic thermometer system according to a second embodiment is described with reference to the drawings.

Hereafter, components identical to the components in the first embodiment are denoted by the same reference numerals and their descriptions are not repeated here, while only the different components are described.

Figure 2:
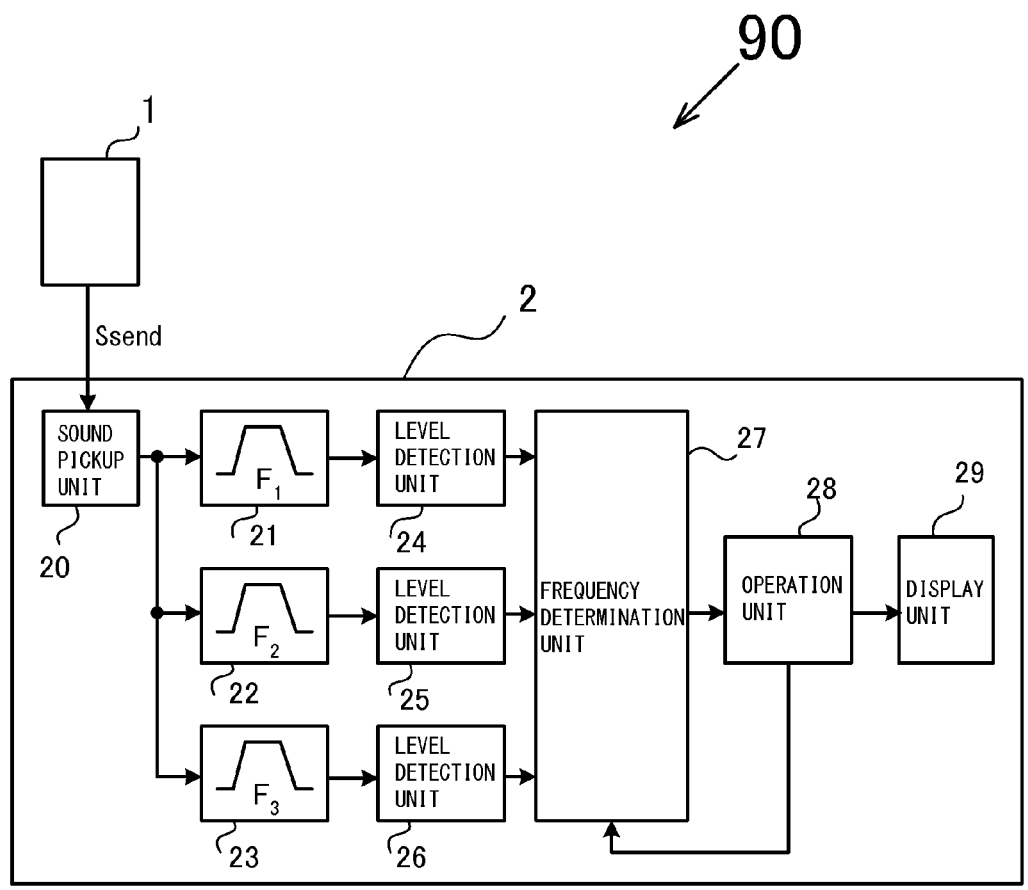
FIG. 2 is a diagram showing the configuration of an electronic thermometer system according to a second embodiment.

FIG. 2 is a diagram showing the configuration of an electronic thermometer system. An electronic thermometer system 90 includes the electronic thermometer 1 and a receiver 2 as shown in FIG. 2.

The receiver 2 includes a sound pickup unit 20, band-pass filters 21 to 23, level detection units 24 to 26, a frequency determination unit 27, an operation unit 28, and a display unit 29. The sound pickup unit 20 includes a microphone, for example. The sound pickup unit 20 receives the transmission signal Ssend from the electronic thermometer 1 and picks up the transmission signal as sound data. The sound data picked up by the sound pickup unit 20 is output to the band-pass filters 21 to 23.

Each of the band-pass filters 21 to 23 extracts a signal in a predetermined frequency band, and cuts signals in other frequency bands. The band-pass filter 21 has a frequency band corresponding to the first frequency $F_1$, for example. The band-pass filter 22 has a frequency band corresponding to the second frequency $F_2$. The band-pass filter 23 has a frequency band corresponding to the third frequency $F_3$.

The output of the band-pass filter 21 is sent to the level detection unit 24. The output of the band-pass filter 22 is sent to the level detection unit 25. The output of the band-pass filter 23 is sent to the level detection unit 26. The level detection unit 24 detects the level of a signal from the band-pass filter 21. The level detection unit 25 detects the level of a signal from the band-pass filter 22. The level detection unit 26 detects the level of a signal from the band-pass filter 23.

The outputs of the level detection units 24, 25, 26 are sent to the frequency determination unit 27. The frequency determination unit 27 weights each of the outputs of the level detection units 24, 25, 26 by a predetermined magnification. The frequency determination unit 27 extracts predetermined-weighted signals and determines the level of the reception signals composed of frequencies $F_1$ to $F_3$.

The output of the frequency determination unit 27 is sent to the operation unit 28. The operation unit 28 detects the reception level of each frequency of the pilot signal composed of frequencies $F_1$ to $F_3$ of the signals sent from the frequency determination unit 27. The operation unit 28 sends a predetermined adjustment signal to the frequency determination unit 27 in accordance with the detection result of the reception level of the pilot signal composed of frequencies $F_1$ to $F_3$. The operation unit 28 adjusts weighting in the frequency determination unit 27 to adjust a detection level. Adjustment of the detection level of the frequency determination unit 27 makes it possible to obtain an equalized signal. The operation unit 28 converts the FSK modulation signal (data portion) supplied from the frequency determination unit 27 to a digital signal (binary signal). The operation unit 28 detects the checksum signal to check the validity of the data.

The digital signal from the operation unit 28 is sent to the display unit 29 and display is performed based on the digital signal. The display unit 29 is composed of a liquid crystal display (LCD), for example.

The band-pass filters 21 to 23, the level detection units 24 to 26, the frequency determination unit 27, and the operation unit 28 may be configured by software as well as by hardware such as a semiconductor integrated circuit. In particular, when an existing electronic device such as a smartphone with a sound pickup unit is used as a receiver, the embodiment allows the existing electronic device to function as the receiver without any change in the hardware configuration. For example, this can be accomplished by downloading software with the function of the embodiment through a communication circuit to a smartphone or the like. Thus, portable electronic devices such as smartphones, mobile phones, or tablet PCs, and electronic devices such as personal computers, each having a communication function, can be easily used as the receiver of the embodiment.

Figure 3A:
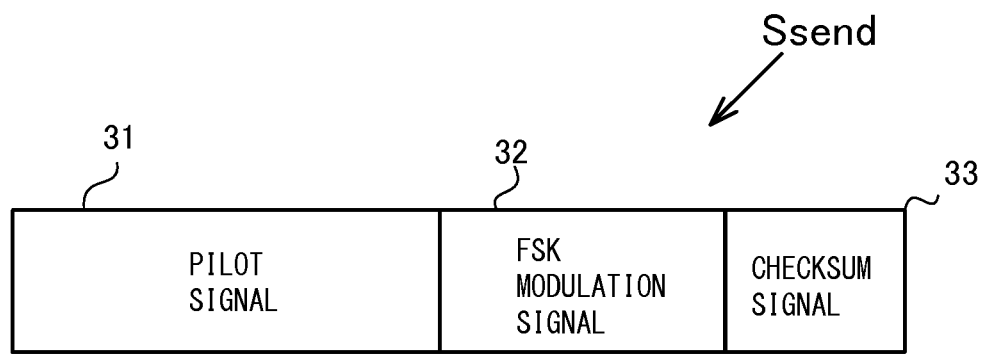
FIGS. 3A and 3B are diagrams showing a signal sent from the electronic thermometer.
Figure 3B:
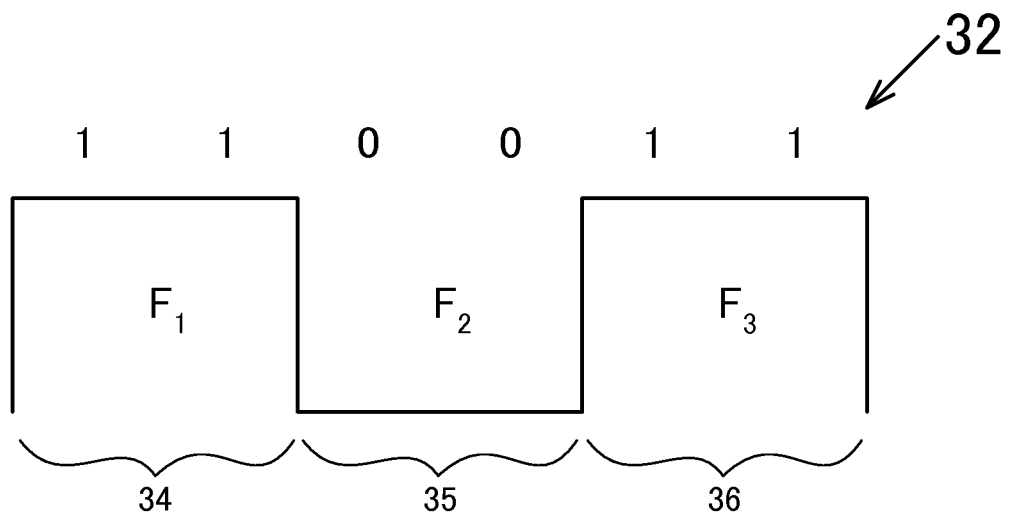

FIGS. 3A and 3B are diagrams showing a signal sent from an electronic thermometer. As shown in FIG. 3A, a transmission signal Ssend sent from the electronic thermometer 1 includes a pilot signal 31, an FSK modulation signal 32, and a checksum signal 33. The FSK modulation signal 32 is an FSK-modulated signal. The FSK modulation signal 32 is sent after the pilot signal 31. The checksum signal 33 is sent after the FSK modulation signal 32. The pilot signal 31 is composed of the frequencies $F_1$ to $F_3$ that are assigned to generate the FSK modulation signal. For example, each of the frequencies $F_1$ to $F_3$ includes a period of 100 ms. The transmission time of the pilot signal 31 is selected based on the transmission rate of the FSK modulation signal 32 subsequently transmitted. For example, when the transmission rate of the FSK modulation signal 32 is 600 bps, time of about 100 times the time required for the transmission is assigned to the transmission of the pilot signal 31. This is because the receiver 2 ensures time to reliably receive the pilot signal 31. The signal shown in FIG. 3A is transmitted multiple times from the electronic thermometer 1 to the receiver 2.

FIG. 3B is a diagram showing the configuration of the FSK modulation signal 32. As shown in FIG. 3B, the FSK modulation signal 32 is represented as binary digits "1100", for example, which is a measured value. The first frequency $F_1$ is assigned to a first digital signal 34 consisting of binary digits "11". The second frequency $F_2$ is assigned to a second digital signal 35 consisting of binary digits "00". A third digital signal 36 corresponds to the first digital signal 34 of the binary digits "11". The third frequency $F_3$ is assigned to the third digital signal 36 consisting of binary digits "11".

Two frequencies $F_1$ and $F_3$ are assigned to a binary digit "1" for the case of the signal of the embodiment. Thus, even if the reception condition of one frequency $F_3$ is not good, measured data can be properly detected in the case where the reception condition of the digital signal 34 to which the frequency $F_1$ is assigned is good. The digital signals 34 and 36 assigned to the binary digits "11" may be transmitted simultaneously, where data may be rearranged by the operation unit 28 of the receiver 2.

In the embodiment, two frequencies are assigned to a digital signal corresponding to "1", which is one of binary data of the FSK modulation signal. The frequency of the FSK modulation signal 32 higher than an audible frequency for humans facilitates the separation of audio signals or the like in the audible range and data signals. On the other hand, high-frequency signals are rapidly attenuated. The reliability of the signal transmission can be improved by assigning the same binary digit "0" or "1" of the measured data to two different frequencies and sending the binary digit "0" or "1". This allows a reception signal having a frequency in a good reception condition to be adopted, signal reception results of the two frequencies to be added, and a predetermined error correction to be easily performed based on the received results. In addition, the pilot signal 31 is transmitted prior to data transmission using the FSK modulation signal 32, and the reception conditions of the receiver can be adjusted based on the reception result of the pilot signal 31. Thus, the embodiment can accommodate environmental changes surrounding a signal transmission line due to various conditions.

Figure 4:
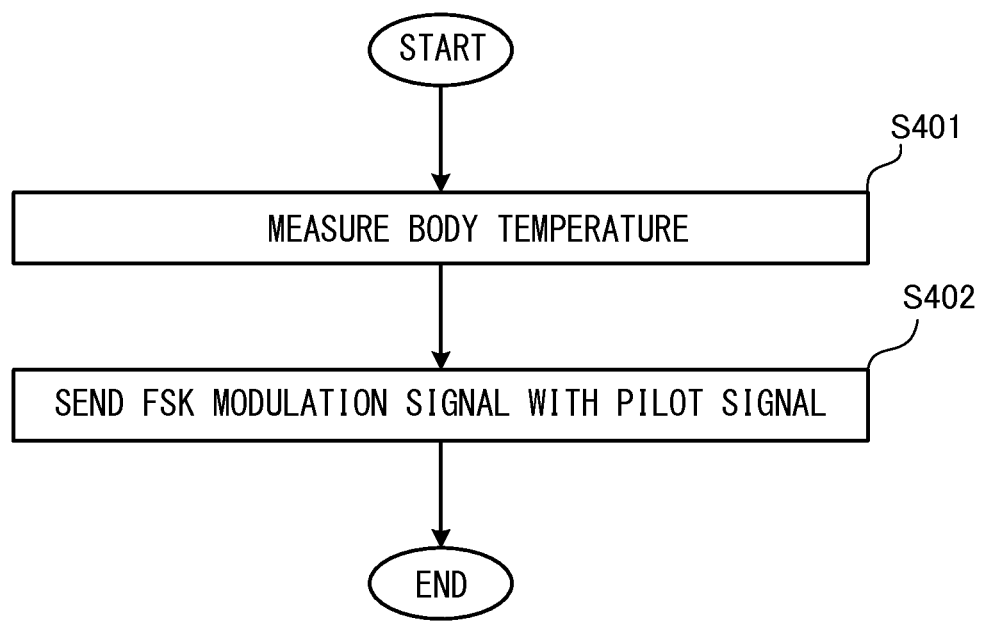
FIG. 4 is a diagram showing the operation steps of sending a signal in the electronic thermometer.

FIG. 4 is a diagram showing the operation steps of sending a signal in an electronic thermometer. As shown in FIG. 4, the electronic thermometer 1, which is held tightly under the armpit etc. of a subject, starts to measure body temperature (step S401).

Upon completion of measuring the body temperature of the subject, the electronic thermometer 1 sends the FSK modulation signal with the pilot signal (step S402). Here, the operation steps of sending the signal in the electronic thermometer 1 are completed. In the case of sending the FSK modulation signal with the pilot signal, a signal that has been stored in a predetermined memory (not shown) of the electronic thermometer 1 may be transmitted in response to a predetermined start signal (not shown).

Figure 5:
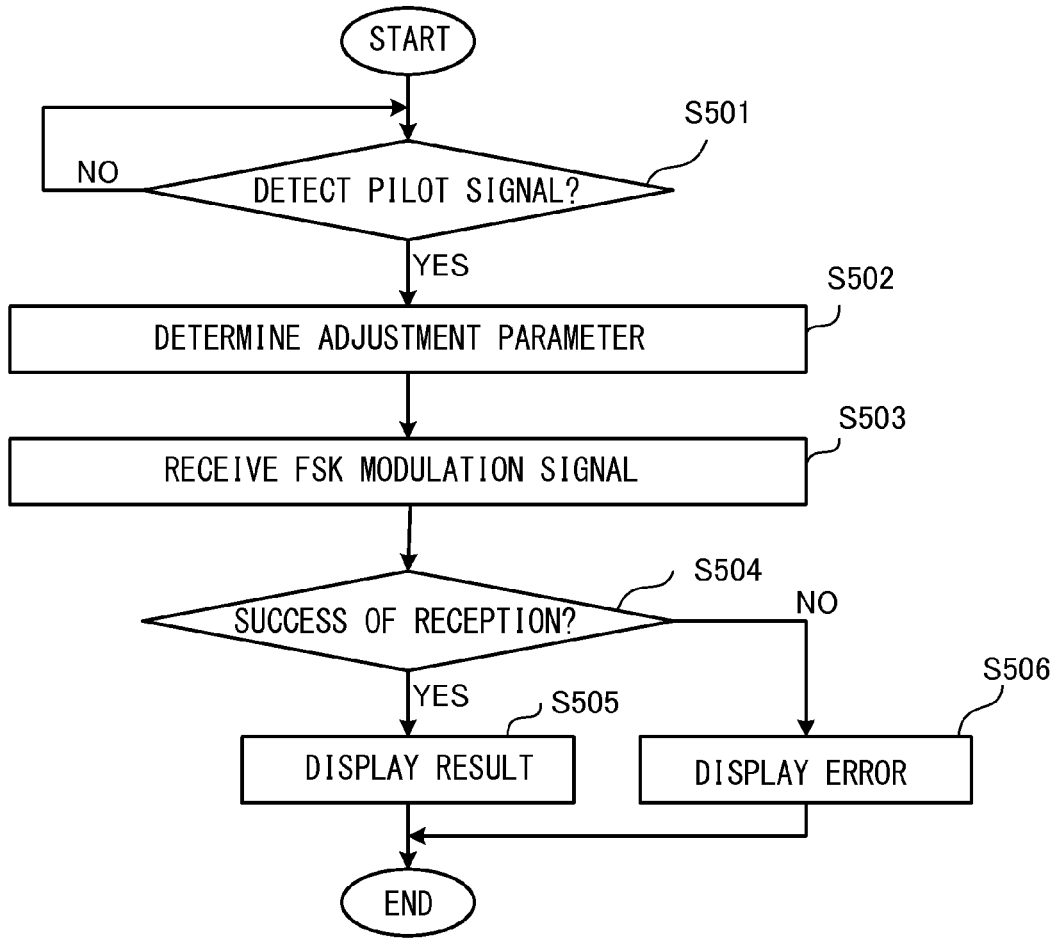
FIG. 5 is a diagram showing the operation steps of receiving a signal in a receiver.

FIG. 5 is a diagram showing the operation steps of receiving a signal in the receiver. As shown in FIG. 5, the receiver 2 detects the pilot signal (step S501).

When the pilot signal is not detected, the step returns to the detection operation of the pilot signal. When the pilot signal is detected, the adjustment parameter of the receiver is determined based on the detection level (step S502). The adjustment parameter is determined to equalize the detection level of the reception signal (FSK modulation signal).

The FSK modulation signal is received in a adjusted reception condition. Specifically, the receiver 2 receives a reception signal, and weights the reception signal by the adjustment parameter (step S503).

The receiver 2 detects the checksum signal included in the received data, and determines whether the reception is successful (step S504).

When the reception is successful, the result is displayed (step S505). When the reception fails, an error message is displayed (step S506).

Here, the operation steps of receiving signals of the receiver shown in FIG. 5 are an example shown to implement the embodiment. For example, when the reception fails, the FSK modulation signal may be sent from the electronic thermometer again. Additionally, the electronic thermometer may continue to transmit until the reception is successful in step 504 and feedback to stop the transmission may be provided to the electronic thermometer after a successful reception is confirmed.

The electronic thermometer system of the embodiment includes the electronic thermometer 1 and the receiver 2 as described above. The receiver 2 includes the sound pickup unit 20, the band-pass filters 21 to 23, the level detection units 24 to 26, the frequency determination unit 27, the operation unit 28, and the display unit 29. The transmission signal Ssend sent from the electronic thermometer 1 includes the pilot signal 31, the FSK modulation signal 32, and the checksum signal 33. Two frequencies $F_1$ and $F_3$ are assigned to a binary digit "1" in the embodiment. Thus, even if the reception condition of one frequency $F_3$ is not good, the measured data can be properly detected when the reception condition of the digital signal 34 to which the frequency $F_1$ is assigned is good.

Accordingly, the electronic thermometer system 90 can improve the reliability of the signal representing the measurement result.

A storage case (not shown) dedicated to the electronic thermometer 1 with a predetermined display may be used as the receiver 2 in the embodiment. Electronic devices, portable devices such as mobile phones, smartphones, or tablet PCs, and personal computers, etc. with a built-in microphone can be used as the receiver 2. When an existing electronic device such as a smartphone that is not a receiver dedicated to an electronic thermometer is used, the reception conditions of the receiver can be controlled based on the reception condition of a pilot signal before receipt of the measured data by sending the pilot signal prior to transmission of the FSK modulation signal. In this case, data reception accuracy can be further increased.

According to the embodiment, an increase in the number of frequencies assigned to the FSK modulation signal can further improve the reliability of data signal transmission. When four frequencies $F_1$ to $F_4$ are assigned as an example, the frequencies $F_1$ and $F_3$ are assigned to a binary digit "0" and the frequencies $F_2$ and $F_4$ are assigned to a binary digit "1", for example, in descending order of frequency. The FSK modulation signal received may be demodulated by adopting one of the frequencies $F_1$ and $F_3$ assigned to the same binary digit "0" or one of the frequencies $F_2$ and $F_4$ assigned to the same binary digit "1". The received signal may be demodulated by adding the reception signals of the frequencies $F_1$ and $F_3$ or the reception signals of the frequencies $F_2$ and $F_4$. Assignment of multiple frequencies to a binary digit "0" or "1" or both of binary digits "0" and "1" of the FSK modulation signal can increase accuracy of signal transmission and reception. The number of frequencies to be assigned to a binary digit is not limited to two, and three or more frequencies may be assigned.

While certain embodiments have been described, these embodiments have been presented by way of example only, and are not intend to limit the scope of the inventions. Indeed, the novel embodiments described herein may be embodied in a variety of the other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic thermometer comprising:
    a thermistor to detect a temperature of a subject;
    a conversion unit to convert a result detected by the thermistor to a digital signal;
    an FSK (frequency shift keying) modulation unit to convert the digital signal to an FSK modulation signal having a frequency equal to or higher than 10 KHz; and
    a transmission unit to output a transmission signal including a pilot signal having a frequency assigned to the FSK modulation signal and the FSK modulation signal subsequent to the pilot signal.

2. The thermometer according to claim 1, wherein the transmission signal includes a checksum signal transmitted after the FSK modulation signal.

3. The thermometer according to claim 1, wherein binary data of the digital signal is assigned to three or more frequencies.

4. The thermometer according to claim 3, wherein the binary data is "1" and "0", and at least two frequencies are assigned to "1" and at least the other one frequency is assigned to "0".

5. The thermometer according to claim 1, wherein the frequency assigned to the FSK modulation signal is in the range of 10 KHz to 22 KHz.

* * * * *